United States Patent [19]

Liu

[11] Patent Number: 4,584,338

[45] Date of Patent: Apr. 22, 1986

[54] HIGH IMPACT STRENGTH POLYCARBONATE RESIN COMPOSITION

[75] Inventor: Ping Y. Liu, Naperville, Ill.

[73] Assignee: General Electric Company, Mt. Vernon, Ind.

[21] Appl. No.: 477,740

[22] Filed: Mar. 22, 1983

Related U.S. Application Data

[63] Continuation-in-part of Ser. No. 343,947, Jan. 29, 1982, abandoned.

[51] Int. Cl.$^4$ .................. C08K 3/40; C08L 51/06; C08L 52/02; C08L 69/00
[52] U.S. Cl. .................. 524/504; 524/505; 525/67; 525/71; 525/92
[58] Field of Search .................. 525/67, 148, 92, 71; 524/504, 505, 537

[56] References Cited

U.S. PATENT DOCUMENTS

| | | | |
|---|---|---|---|
| 3,801,673 | 4/1974 | O'Connell | 525/148 |
| 4,088,711 | 5/1978 | Gergen et al. | 525/92 |
| 4,218,545 | 8/1980 | Serini et al. | 525/92 |
| 4,263,201 | 4/1981 | Mark et al. | 525/148 |
| 4,271,064 | 6/1981 | Dieck | 525/92 |
| 4,299,928 | 11/1981 | Witman | 525/67 |

*Primary Examiner*—Allan M. Lieberman
*Attorney, Agent, or Firm*—Martin B. Barancik

[57] ABSTRACT

The compositions of the invention comprise a high molecular weight polycarbonate resin and a hydrogenated AB diblock copolymer wherein A is derived from an alkenyl aromatic compound and B is derived from isoprene. The compositions may also include minor amounts of an acrylic interpolymer.

15 Claims, No Drawings

HIGH IMPACT STRENGTH POLYCARBONATE RESIN COMPOSITION

CROSS-REFERENCE TO RELATED APPLICATION

This application is a continutation-in-part of copending application Ser. No. 343,947, filed Jan. 29, 1982, now abandoned.

BACKGROUND OF THE INVENTION

Polycarbonate resins have high impact resistance with ductility to notch or crack propagation at an average of up to about 0.2 inches thickness when the incident notch is 10 mils (thousandths of an inch) in radius. Above this average thickness the impact resistance and ductility of polycarbonate resins decline. This phenomena is commonly found in glassy plastics and is referred to as the critical thickness for notched impact resistance of a glassy plastic.

In addition, the impact strength of notched polycarbonate resins decreases as temperatures decrease below about $-5°$ C. and also after aging the polymers at elevated temperatures above about 100° C. These temperatures are commonly found in applications where extremes of heat and cold are to be expected.

Thus, it is desirable to modify a polycarbonate resin composition to extend the impact strength and ductility of polycarbonate resins to variable thickness parts or articles of use which resist embrittlement upon exposure to high or low temperatures in a notched or scratched condition.

Compositions are known which extend the high impact resistance and ductility characteristics of polycarbonate resins to parts beyond the critical thickness and under low and high temperature aging conditions, but many of these compositions suffer from incompatibilities of the polymeric components which results in poor weldline or knit line strength in fabricated parts as evidenced by low double-gate impact strengths when measured according to ASTM D256.

The applicant has found that the use of a minor amount of a hydrogenated AB diblock copolymer, wherein one block is derived from isoprene and the other from an alkenyl aromatic compound, e.g., styrene, in combination with a polycarbonate resin, will improve the impact strength of the polycarbonate resin. These compositions are compatible and have good surface characteristics. They may also include a minor amount of a multiphase composite interpolymer which comprises a $C_{1-5}$ acrylate and a $C_{1-5}$ methacrylate.

DETAILED DESCRIPTION OF THE INVENTION

The compositions of the invention comprise:
 (a) a high molecular weight polycarbonate resin;
 (b) a hydrogenated AB diblock copolymer wherein A is derived from an alkenyl aromatic compound and B is derived from isoprene.

The compositions of the invention may optionally include a multiphase composite interpolymer which comprises a $C_{1-5}$ acrylate and a $C_{1-5}$ methacrylate.

The polycarbonate resin may be of the formula:

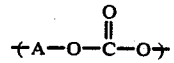

wherein A is a divalent aromatic radical. Preferred polycarbonate resins are of the formula:

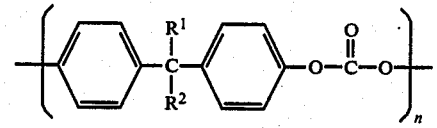

wherein $R^1$ and $R^2$ are hydrogen, (lower) alkyl or phenyl and n is at least 30 or preferably between 40 and 400. The term (lower) alkyl includes alkyl groups of from 1-6 carbon atoms.

High molecular weight, thermoplastic, aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of 0.30 to 1.0 dl/g as measured in methylene chloride at 25° C. These polycarbonates are derived from dihydric phenols such as, for example, 2,2-bis (4-hydroxyphenyl)propane, bis(4-hydroxyphenyl) methane, 2,2-bis(4-hydroxy-3-methylphenyl)propane, 4,4-bis (4-hydroxyphenyl)heptane, 2,2-(3,5,3'-5'-tetrachloro-4,4'-dihydroxyphenyl)propane, 2,2-(3,5,3',5'-tetrabromo-4,4'-dihydroxydiphenyl)propane, and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The block copolymers employed in the present invention have a specific geometrical structure. Each diblock copolymer is to have only one end block A and one dissimilar end block B, as defined above. This distinguishes them from A-B-A structures in which at least two polymer end blocks A and a midblock B is present. Methods for the preparation of the A-B diblock copolymers are known in the art. Particular reference will be made to the use of lithium based catalysts, and especially lithium alkyls for the preparation of precursor diblock copolymers (polymers before hydrogenation). Special mention is made of Porter, U.S. Pat. No. 3,149,182, Examples I and III, to show preparation of a butyl lithium catalyst and its use to prepare diblock copolymers of isoprene and styrene (by two alternate methods). Wald et al., U.S. Pat. No. 3,595,942 describes suitable methods for hydrogenation of the diblock copolymers. Both patents are incorporated herein by reference. It will be understood that both blocks A and B may be either homopolymer or random copolymer blocks as long as each block predominates in at least one class of the monomers characterizing the blocks and as long as the A blocks individually predominate in alkenyl aromatic compound and the B blocks individually predominate in isoprene or butadiene, preferably isoprene. The term alkenyl aromatic compound will be taken to include styrene and its analogs and homologs including alpha methylstyrene and ring-substituted styrenes, particularly ring-methylated styrenes. The preferred alkenyl aromatic compounds are styrene and alpha methylstyrene, and styrene is particularly preferred. When isoprene is polymerized in the 1,2-configuration, and then the resulting block is hydrogenated, the diblock copolymer is, or resembles, a regular copolymer block of ethylene and propylene. The AB diblock copolymer of styrene and isoprene, after hydrogenation, is also properly characterized as a styrene-ethylene/propylene copolymer. Hydrogenation of the precursor block copolymer is preferably effected by use of a catalyst comprising the reaction products of an aluminum alkyl compound with nickel or cobalt carboxylates or alkoxides under such conditions as to hydrogenate at least 80% of the aliphatic double bonds while hydrogenating no more than about 25% of the aromatic double bonds. Preferred block copolymers are those where at least 99% of the aliphatic double bonds are hydrogenated while less than 5% of the aromatic double bonds are hydrogenated. Typically, block A can have an average molecular weight of between 8,000 and 60,000 and block B can have an average molecular weight of between 50,000 and 300,000. The proportion of alkenyl aromatic compound blocks can vary between 8 and 85 parts by weight of blocks A and B together. A suitable material for use in the present invention can also be obtained from Shell Oil Company, Houston, Texas 77210, U.S.A. under the tradename KRATON ® GX 1702. This hydrogenated styrene/isoprene diblock copolymer is ordinarily supplied with minor amounts of antioxidant/stabilizer.

The multiphase composite interpolymers which comprise a $C_{1-5}$ acrylate and a $C_{1-5}$ methacrylate are described in U.S. Pat. Nos. 4,260,693 and 4,096,202, both of which are incorporated by reference. These interpolymers consist of about 25 to 95 weight percent of a first elastomeric phase polymerized from a monomer system comprising about 75 to 99.8 percent by weight of a $C_{1-5}$ alkyl acrylate, 0.1 to 5 percent by weight crosslinking monomer, and 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizes at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

The compositions of the invention may comprise from about 80.0 to 99.0 parts by weight of polycarbonate resin and from about 20.0 to 1.0 parts by weight of the hydrogenated AB diblock copolymer. Parts by weight are based on the total weight of polycarbonate and AB diblock copolymer. Preferred ranges comprise from about 90.0 to 98.0 parts by weight of the polycarbonate and from about 10.0 to 2.0 parts by weight of the hydrogenated AB diblock copolymer. Especially preferred compositions comprise from about 92.0 to 97.0 parts by weight of polycarbonate and from about 3.0 to 8.0 parts by weight of the AB diblock copolymer. A multiphase composite interpolymer comprising a $C_{1-5}$ acrylate and a $C_{1-5}$ methacrylate may be added at a level of from about 1 to 12% by weight or more preferably at a level of from about 2 to 8% by weight of the weight of polycarbonate plus AB diblock copolymer.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, is also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about $\frac{1}{8}$" to about 1" long, preferably less than $\frac{1}{4}$" in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Flame retardant amounts of flame retardants may also be utilized in the composition of the invention in amounts of from 0.5-50 parts by weight of the resinous components. Examples of suitable flame retardants may be found in U.S. Pat. Nos. 3,936,400 and 3,940,366 which are incorporated by reference. Other conventional nonreinforcing fillers, antioxidants, extrusion aids, light stabilizers, foaming agents such as those disclosed in U.S. Pat. No. 4,263,409 and Ger. Offen. No. 2,400,086, which are incorporated by reference and the like may be added to the composition of the invention if desired.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

The preferred molding temperatures are in excess of 280° C. as it has been found that the impact properties of the compositions molded at temperatures in excess of 280° C. are improved. A temperature up to the decomposition point of the polymers may be used.

The term double gate is used to refer to the preparation of a molded sample in a mold having two entry ports that result in a weld line at the junction of the fluid resin in the mold during the molding cycle. The design, preparation of the molded part, and testing of the following examples are according to ASTM D256.

DESCRIPTION OF THE PREFERRED EMBODIMENTS

The following examples illustrate the invention. All parts are by weight. Izod impact strengths are reported as ft.lb./in. of notch. Double gate (DG) values are reported in ft.lb.

EXAMPLE 1

A 1500.0 g molding composition was prepared from 96.0 parts by weight of a polycarbonate of 2,2-bis(4-hydroxyphenyl)propane*; and 4.0 parts by weight of a hydrogenated AB diblock copolymer, specifically a hydrogenated styrene-isoprene** diblock copolymer was prepared by dry blending powdered forms of the polymers followed by extrusion at 265° C. The composition was molded at 288° C. into standard test bars that were tested for impact strength. The test data appears in Table 1 and the superscripts refer to the percent ductility.

* I.V. 0.49 dl/g in $CH_2Cl_2$ at 25° C.
** KRATON GX1702, Shell Chemical Co.

TABLE 1

| SAMPLE | $\frac{1}{8}$" NOTCHED IZOD | $\frac{1}{4}$" NOTCHED IZOD | DG |
|---|---|---|---|
| A | 14.8[100] | 13.5[100] | 19.3[100] |
| B*** | 14.8[100] | 1.6[0] | 40.0[100] |

***100% polycarbonate of bisphenol-A; I.V. 0.49 dl/g in $CH_2Cl_2$ at 25° C.

The addition of the AB diblock copolymer provides a composition which has a significantly higher $\frac{1}{4}$" section impact resistance which is 100% ductile at break. The double gate value is also quite high and also ductile at break.

EXAMPLE 2

A 1500.0 g molding composition was prepared from the same materials and the same procedure that was utilized in Example 1 except that 90.0 parts by weight of the polycarbonate resin were utilized and 10.0 parts by weight of the AB diblock copolymer were utilized and the parts were molded at 260° C. They are identified as Sample C in Table 2. A second sample, D, was prepared which had the same composition but was molded at 288° C. These compositions had the following physical properties:

TABLE 2

| SAMPLE | $\frac{1}{8}$" NOTCHED IZOD | $\frac{1}{4}$" NOTCHED IZOD | DG |
|---|---|---|---|
| C | — | — | 2.6[0] |
| D | 13.3[100] | 11.2[100] | 9.8[80] |

The use of a higher molding temperature appears to have an effect on the impact strength of the composition.

EXAMPLE 3

A 1500.0 g molding composition was prepared according to the procedure of Example 1 which had 90.0 parts by weight of the polycarbonate of Example 1; 10.0 parts by weight of the AB diblock copolymer; and 4.0 parts by weight of a multiphase composite interpolymer comprising n-butyl acrylate and methyl methacrylate*. Test bars of this composition that were molded at 288° C. had the impact strength reported in Table 3.

*Acryloid KM 330 obtained from Rohm & Haas, Phila. PA

TABLE 3

| SAMPLE | 1/8" NOTCHED IZOD | 1/4" NOTCHED IZOD | DG |
|---|---|---|---|
| E | 13.3[100] | 10.7[100] | 9.5[100] |

EXAMPLE 4

A 1500.0 g molding composition was prepared according to the procedure of Example 1 which has 94.0 parts by weight of the polycarbonate of Example 1 and 6.0 parts by weight of the AB diblock copolymer. Test bars of this composition that were molded at 288° C. had the impact strength reported in Table 4.

TABLE 4

| SAMPLE | 1/8" NOTCHED IZOD | 1/4" NOTCHED IZOD | DG |
|---|---|---|---|
| F | 13.9[100] | 12.1[100] | 14.8[100] |

The impact strengths of this composition are similar to the strengths shown in Example 1, the difference in composition being slightly more AB diblock copolymer.

Obviously, other variations are possible in light of the above teachings. It is therefore to be understood that changes may be made in the particular embodiments of the invention described which are within the full intended scope of the invention as defined by the appended claims.

What is claimed is:

1. A thermoplastic molding composition exhibiting excellent room temperature impact strength in the form of high 1/8" notched Izod impact strength, high 1/4" notched Izod impact strength and high double gate impact strength and excellent ductility in comparison with polycarbonate alone consisting essentially of:
   a. from 80 to 99 parts by weight of a high molecular weight aromatic polycarbonate resin, the aromatic groups of said resin being unsubstituted; and
   b. from 1 to 20 parts by weight of a thermoplastic hydrogenated AB diblock copolymer wherein A is derived from an alkenyl aromatic compound and B is derived from isoprene or butadiene per 100 parts of the polycarbonate plus the diblock copolymer.

2. A thermoplastic molding composition as defined in claim 1 wherein the high molecular weight aromatic polycarbonate resin is of the formula:

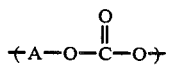

wherein A is a divalent aromatic radical of a dihydric phenol.

3. A thermoplastic molding composition as defined in claim 2 wherein the aromatic polycarbonate resin is of the formula:

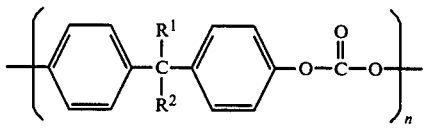

wherein $R^1$ and $R^2$ are hydrogen, (lower) alkyl or phenyl and n is at least 30.

4. A thermoplastic molding composition as defined in claim 3 wherein the B block of the copolymer is derived from isoprene.

5. A thermoplastic molding composition as defined in claim 3 wherein the copolymer is a styreneisoprene block copolymer.

6. A thermoplastic molding composition as defined in claim 4 wherein the polycarbonate is derived from 2,2-bis(4-hydroxyphenyl)propane.

7. A thermoplastic molding composition as defined in claim 1 which also includes (c) from 1 to 12% by weight of a multiphase composite interpolymer which comprises a $C_{1-5}$ acrylate and a $C_{1-5}$ methacrylate per 100 parts of the polycarbonate plus the diblock copolymer.

8. A thermoplastic molding composition as defined in claim 7 wherein the multiphase composite interpolymer comprises methyl methacrylate and n-butyl acrylate.

9. A thermoplastic molding composition as defined in claim 1 which also includes a reinforcing amount of a reinforcing filler.

10. A thermoplastic molding composition as defined in claim 9 wherein the reinforcing filler is filamentous glass.

11. A thermoplastic molding composition as defined in claim 1 which includes a flame retardant amount of a flame retardant.

12. A thermoplastic molding composition as defined in claim 9 which includes a flame retardant amount of a flame retardant.

13. A thermoplastic molding composition as defined in claim 7 wherein said interpolymer (c) comprises a first elastomeric phase polymerized from a monomer system comprising a $C_1$-$C_5$ alkyl acrylate, a crosslinking monomer and a graft-linking monomer and a rigid thermoplastic phase comprising $C_1$-$C_5$ methacrylate.

14. A thermoplastic molding composition exhibiting high ductility and high impact resistance, said composition comprising:
   (a) from about 80.0 to 99.0 parts by weight of a high molecular weight aromatic polycarbonate resin;
   (b) from about 20.0 to 1.0 parts by weight of a thermoplastic hydrogenated AB diblock copolymer wherein A is derived from an alkenyl aromatic compound and B is derived from isoprene, per 100 parts by weight of the polycarbonate plus the diblock copolymer; and
   (c) from about 1 to 12 parts by weight per 100 parts by weight of polycarbonate plus diblock copolymer, of a multiphase composite interpolymer which comprises a first elastomeric phase polymerized from a monomer system comprising a $C_1$-$C_5$ alkyl acrylate, a crosslinking monomer and a graftlinking monomer and a rigid thermoplastic phase comprising $C_1$-$C_5$ methacrylate.

15. A thermoplastic molding composition exhibiting high ductility and high impact resistance, said composition comprising:

(a) from about 80.0 to 99.0 parts by weight of a high molecular weight aromatic polycarbonate resin having a number average molecular weight of about 80,000 to more than 200,000 and an intrinsic viscosity (I.V.) of 0.30 to 1.0 dl/g as measured in methylene chloride at 25° C.;

(b) from about 20.0 to 1.0 parts by weight of a thermoplastic hydrogenated AB diblock copolymer wherein A is derived from an alkenyl aromatic compound and B is derived from isoprene, per 100 parts of the polycarbonate plus the diblock copolymer; and (c) from about 1 to 12 parts by weight per 100 parts by weight of polycarbonate plus diblock copolymer, of a multiphase composite interpolymer comprising:

(i) from about 25 to 95% by weight of a first elastomeric phase polymerized from a monomer system comprising about 75% to 99,8% by weight of a $C_1$–$C_5$ alkyl acrylate, 0.1 to 5% by weight of a crosslinking monomer, said crosslinking monomer, being a polyethylenically unsaturated monomer having a plurality of addition polymerizable reactive groups all of which polymerize at substantially the same rate of reaction, and 0.1 to to 5% by weight of a graft-linking monomer, said graft-linking monomer being a polyethylenically unsaturated monomer having a plurality of addition polymerizable reactive groups, at least one of which polymerizes at a substantially different rate of polymerization from at least one other of said reactive groups; and (ii) from about 75% to 5% by weight of a rigid thermoplastic phase comprising a $C_1$–$C_5$ methacrylate.

* * * * *